Figure 1:
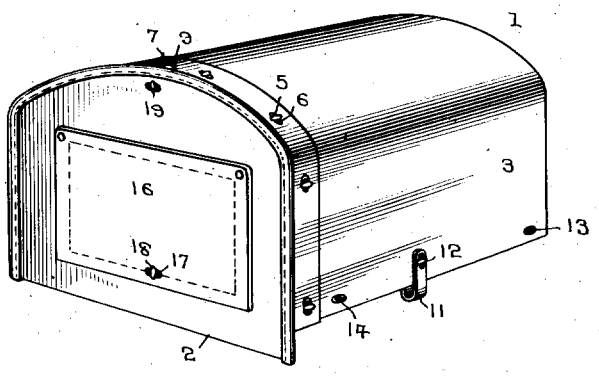

C. D. MILLER.

ENGINE HOOD COVER.

APPLICATION FILED MAY 16, 1913.

Reissued May 11, 1915.

13,916.

2 SHEETS—SHEET 1.

Witnesses

Thomas Riley

M. Newcomb

Inventor

C. D. Miller

By W. J. Fitzgerald & Co

Attorneys

C. D. MILLER.

ENGINE HOOD COVER.

APPLICATION FILED MAY 16, 1913.

Reissued May 11, 1915.

13,916.

2 SHEETS—SHEET 2.

Witnesses

Thos. Riley

M. Newcomb

Inventor

C. D. Miller

By W. J. Fitzgerald & Co

Attorneys

UNITED STATES PATENT OFFICE.

CLINTON D. MILLER, OF WASHINGTON, DISTRICT OF COLUMBIA.

ENGINE-HOOD COVER.

13,916. Specification of Reissued Letters Patent. Reissued May 11, 1915.

Original No. 1,054,592, dated February 25, 1913, Serial No. 724,958. Application for reissue filed May 16, 1913. Serial No. 768,173.

*To all whom it may concern:*

Be it known that I, CLINTON D. MILLER, a citizen of the United States, residing at Washington, in the District of Columbia, have invented certain new and useful Improvements in Engine-Hood Covers; and I do hereby declare the following to be a full, clear, and exact description of the invention, such as will enable others skilled in the art to which it appertains to make and use the same.

This invention has relation to engine hood covers and consists in the novel arrangement of its parts as hereinafter described and claimed.

The object of the invention is to provide a cover adapted to be easily and readily applied to the hood of an automobile engine with means for detachably securing the said cover in position upon the hood.

A further object of the invention is to provide in combination with the cover a detachable end portion which is adapted to lie against the front of the hood. The cover and the end portion mentioned are lined upon their inner sides with felt, fabric or any other suitable non-heat conducting material while the exterior portion of the cover and the end is made from waterproof material.

Another object of the invention is to provide upon the front of the cover a flexible flap which normally lies over the opening in the hood which leads to the ventilator. Immediately under this flap is located a pliable screen which may be left in closed position after the flap is opened or which may be raised and secured in an open position to permit free circulation of the air through the hood of the engine.

With these and other objects in view, the invention consists in certain novel features of construction as hereinafter shown and described, and then particularly pointed out in the claims and in the drawings illustrative of the preferred embodiment of the invention.

Figure 2:
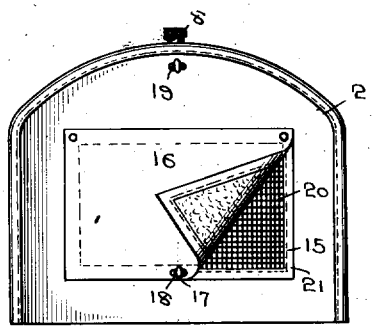
Figure 3:
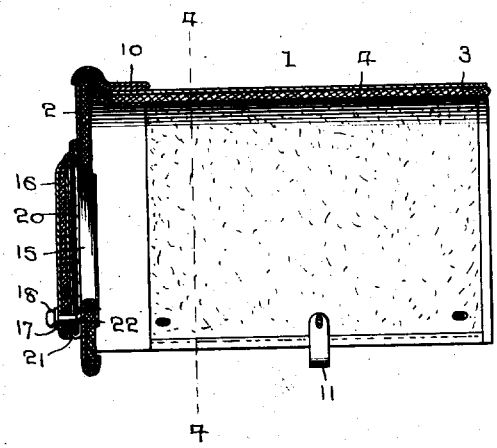
Figure 4:
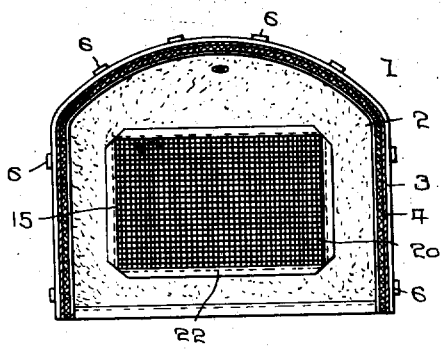

Figure 1 is a perspective view of the engine hood cover. Fig. 2 is a front end view of the same. Fig. 3 is a longitudinal sectional view of the same. Fig. 4 is a transverse sectional view of the same cut on the line 4—4 of Fig. 3.

Corresponding and like parts are referred to in the following description and indicated in all the views of the accompanying drawings by the same reference characters.

The engine hood cover comprises a body portion 1 and a front end portion 2. These portions are preferably composed of two thicknesses of material. The outer material 3 being oil-cloth or other suitable water-proof material and the inner material 4 being of felt, fabric or any other suitable heat non-conducting material. A series of studs 5 is mounted at the forward edge of the body portion 1 and are adapted to engage eyelets 6 provided at the edge of the front portion 2. These studs and eyelets may be of any pattern or design as now generally employed. A recess 7 is provided at the forward edge of the body portion 1 and is adapted to receive the filler nipple 8 of the water jacket of the engine. The front portion 2 is provided with a similar recess 9 which also receives the said nipple. The edge of the front portion 2 is adapted to lie over the forward edge of the body portion 1 and the said front 2 is provided with flap 10 which is adapted to lie under the forward edge of the body portion 1. Billets 11 are secured to the intermediate part of the body portion 1 in the vicinity of the lower edge thereof and are adapted to be passed around the sides of the frame of the automobile and are secured at their ends by means of studs 12 fixed to the intermediate part of the body portion 1. The said body portion 1 is provided at its sides in the vicinity of its rear edge with studs 13 which are adapted to engage eyes 14 located in the vicinity of the forward part of the body portion 1. Therefore the forward part of the body portion 1 may be drawn back and the eyes 14 engaged with the studs whereby the forward portion of the engine hood is left exposed. In a similar manner the rear part of the body portion 1 may be drawn forward and the studs 13 engaged with the eyes 14 whereby the rear portion of the engine hood may be left exposed. This folding of the body portion 1 may be accomplished without removing the billets 11 from the sides of the frame of the machine.

The front portion 1 is provided with an opening 15 which is adapted to register with the opening at the forward end of the engine hood. A flap 16 is secured along the upper edge of the opening 15 and is provided at its inner and outer sides with water-proof material. Between these layers of water-proof material the said flap 16 may be provided with a layer of heat non-conducting material. The flap 16 is provided at its edge with an eye 17. A stud 18 is located upon the front portion 2 at the lower edge of the opening 15 and is adapted to be engaged by the eye 17 of the flap 16. A stud 19 is located upon the front portion 2 in the vicinity of the upper edge thereof and is adapted to be engaged by the eye 17 when the flap 16 is swung to an open position. A pliable flap 20 is secured at its upper edge to the front portion 2 at the upper edge of the opening 15 and is located under the flap 16. This flap 20 is preferably made of screen wire of copper or any other suitable material. The flap 20 is bound by a strip of material 21. The flap 20 is provided at its free edge with an eye 22 which is adapted to receive the stud 18 or the stud 19 according to the position in which the said flap 20 is disposed.

From the above description it will be seen that means is provided for leaving exposed, either the forward or the rear portion of the engine hood or the said hood may be completely covered as desired. Furthermore when the flaps 16 and 20 are swung down and secured, the circulation of air through the forward opening of the engine hood is completely interrupted. When it is desired that air should circulate through the engine hood, the flap 16 is raised and secured in its elevated position. If the weather is inclement the flap 20 is permitted to remain in its lower position. Therefore the wire of which the flap 20 is composed will prevent snow or sleet from entering the engine hood at the same time the air enters the hood. When it is desired that a free circulation of air pass through the engine hood, both of the flaps 16 and 20 are raised and secured at the stud 19. For these reasons it will be seen that a simple and effective engine hood cover is provided which may be adjusted or positioned to meet any and all conditions that the engine may require. At the same time the parts of the cover may be adjusted in order to meet the conditions of temperature or weather.

Having described the invention what I claim, is:

1. An engine hood cover comprising a front portion having an opening, a foraminous flap adapted to swing over said opening, and an impervious flap adapted to swing over the opening.

2. An engine hood cover comprising a front portion having an opening, a pliable foraminous flap adapted to swing over said opening, and an impervious flap adapted to swing over the opening.

3. A protector of the class described, comprising a body adapted to incase the hood of an automobile, a front section associated with said body and adapted to cover the radiator of an automobile, said front section having an opening formed therein to expose a substantial area of the radiator to permit air circulation therethrough, a foraminous closure flexibly connected to the front section of the cover adjacent to said opening for partially cutting off said air circulation, an impervious closure also flexibly connected to the front section of the cover and overlying the foraminous closure for completely cutting off said air circulation, and securing means common to both of said foraminous and impervious closures for retaining the same in either open or closed positions.

In testimony whereof I have signed my name to this specification in the presence of two subscribing witnesses.

CLINTON D. MILLER.

Witnesses:
C. A. Neale,
E. Brown.